United States Patent
Schnapp et al.

(10) Patent No.: US 12,467,306 B2
(45) Date of Patent: Nov. 11, 2025

(54) DOOR DRIVE APPARATUS HAVING A GEAR ASSEMBLY COMPRISING A GUIDE RAIL

(71) Applicant: Brose Fahrzeugteile SE & Co. Kommanditgesellschaft, Bamberg, Bamberg (DE)

(72) Inventors: Daniel Schnapp, Ebensfeld (DE); Tobias Gagel, Zapfendorf (DE); Melanie Angermüller, Heldburg (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 527 days.

(21) Appl. No.: 17/633,603

(22) PCT Filed: Aug. 10, 2020

(86) PCT No.: PCT/EP2020/072400
§ 371 (c)(1),
(2) Date: Feb. 8, 2022

(87) PCT Pub. No.: WO2021/023893
PCT Pub. Date: Feb. 11, 2021

(65) Prior Publication Data
US 2022/0307314 A1    Sep. 29, 2022

(30) Foreign Application Priority Data

Aug. 8, 2019   (DE) .................... 10 2019 211 932.8

(51) Int. Cl.
*E05F 15/63*     (2015.01)
*E05F 15/622*   (2015.01)

(52) U.S. Cl.
CPC ............ *E05F 15/63* (2015.01); *E05F 15/622* (2015.01); *E05F 2015/631* (2015.01)

(58) Field of Classification Search
CPC .... E05F 15/63; E05F 15/622; E05F 2015/631
See application file for complete search history.

(56) References Cited

U.S. PATENT DOCUMENTS 3,398,484 A * 8/1968 Katsumura ........... E05F 15/622
                                                           49/281
6,378,392 B1   4/2002 Dombrowski et al.
(Continued)

FOREIGN PATENT DOCUMENTS

CN       2396166 Y     9/2000
CN     101379262 A     3/2009
(Continued)

OTHER PUBLICATIONS

German Third Party Submission for DE 10 2019 211 932.8, dated Apr. 17, 2024, Google Machine Translation attached to original, All together 8 Pages.
(Continued)

*Primary Examiner* — Gregory J Strimbu
(74) *Attorney, Agent, or Firm* — Dickinson Wright PLLC

(57) ABSTRACT

A door drive apparatus for adjusting a vehicle door relative to a vehicle body including an adjustment part for power transmission between the vehicle door and the vehicle body, a drive motor and a gear assembly coupling the drive motor to the adjustment part. The gear assembly includes a guide rail and a sliding element guided longitudinally on the guide rail along an adjustment direction, which is adjustable by the drive motor and is coupled to the adjustment part, and the guide rail includes two legs extended parallel to each other along the adjustment direction and the sliding element is guided between the legs along the adjustment direction.

14 Claims, 12 Drawing Sheets

(56) References Cited

U.S. PATENT DOCUMENTS

| | | | |
|---|---|---|---|
| 6,814,392 B1* | 11/2004 | Tomaszewski | E05F 15/622 49/343 |
| 8,234,817 B2 | 8/2012 | Neundorf et al. | |
| 9,534,436 B2* | 1/2017 | Osafune | H02K 7/06 |
| 10,174,540 B2 | 1/2019 | Heydel et al. | |
| 11,466,503 B2 | 10/2022 | Tang et al. | |
| 2003/0079413 A1* | 5/2003 | Fukumoto | E05F 15/63 49/341 |
| 2003/0085589 A1* | 5/2003 | Oberheide | E05F 15/622 296/146.8 |
| 2004/0113456 A1 | 6/2004 | Greuel et al. | |
| 2005/0022453 A1* | 2/2005 | Bosio | E05F 15/622 49/343 |
| 2009/0217596 A1* | 9/2009 | Neundorf | E05B 79/20 49/506 |
| 2009/0314111 A1 | 12/2009 | Schunke | |
| 2010/0139428 A1 | 6/2010 | Roither et al. | |
| 2015/0033885 A1 | 2/2015 | Kristen | |
| 2015/0256048 A1 | 9/2015 | Ohta et al. | |
| 2015/0300071 A1* | 10/2015 | Osafune | E05F 15/622 74/89.38 |
| 2016/0312513 A1 | 10/2016 | Heydel et al. | |
| 2018/0155968 A1* | 6/2018 | Miu | E05F 15/70 |
| 2019/0063490 A1* | 2/2019 | Sakiyama | F16C 11/0623 |
| 2019/0203517 A1 | 7/2019 | Herrmann et al. | |
| 2020/0232262 A1* | 7/2020 | Marlia | B60R 25/01 |
| 2021/0238907 A1 | 8/2021 | Tang et al. | |

FOREIGN PATENT DOCUMENTS

| | | | |
|---|---|---|---|
| CN | 101432159 | A | 5/2009 |
| CN | 104662245 | A | 5/2015 |
| CN | 105089413 | A | 11/2015 |
| CN | 106066113 | A | 11/2016 |
| CN | 107923208 | A | 4/2018 |
| CN | 109281568 | A | 1/2019 |
| DE | 19623317 | A1 | 12/1997 |
| DE | 19749668 | A1 | 6/1998 |
| DE | 60305373 | T2 | 11/2006 |
| DE | 102008061120 | A1 | 6/2010 |
| DE | 102015215627 | A1 | 2/2017 |
| DE | 102016223667 | A1 | 5/2018 |
| DE | 102017123483 | A1 | 4/2019 |
| EP | 1354739 | B1 | 5/2006 |
| EP | 1545269 | B1 | 6/2010 |
| EP | 2087258 | B1 | 1/2011 |
| EP | 2027401 | B1 | 10/2011 |
| EP | 2196699 | B1 | 2/2013 |
| JP | 2704592 | A | 3/1995 |
| JP | 2009155900 | A | 7/2009 |
| JP | 2013014996 | A | 1/2013 |
| WO | 02084061 | A1 | 10/2002 |
| WO | 2018002158 | A1 | 1/2018 |
| WO | 2018098594 | A1 | 6/2018 |
| WO | 2018145883 | A1 | 8/2018 |
| WO | 2019072794 | A1 | 4/2019 |
| WO | 2020113983 | A1 | 6/2020 |

OTHER PUBLICATIONS

Chinese Office Action for CN Application No. 202080053984.3, dated Dec. 5, 2022, English Translation attached to original document, all together 11 Pages.

Chinese Request for Invalidation of a Patent for CN 202080053984.3, Dated Jul. 30, 2024, English translation attached to original, All together 206 Pages.

* cited by examiner

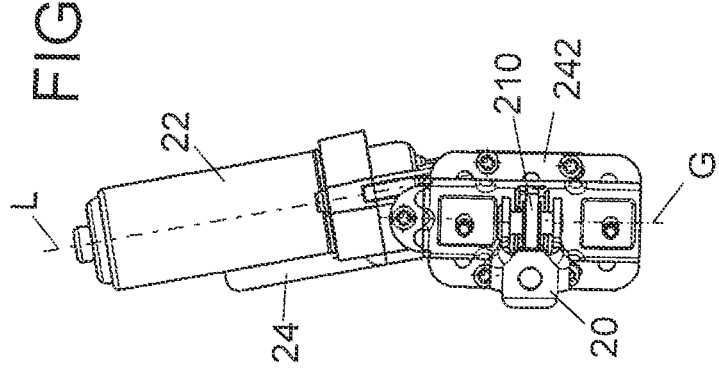
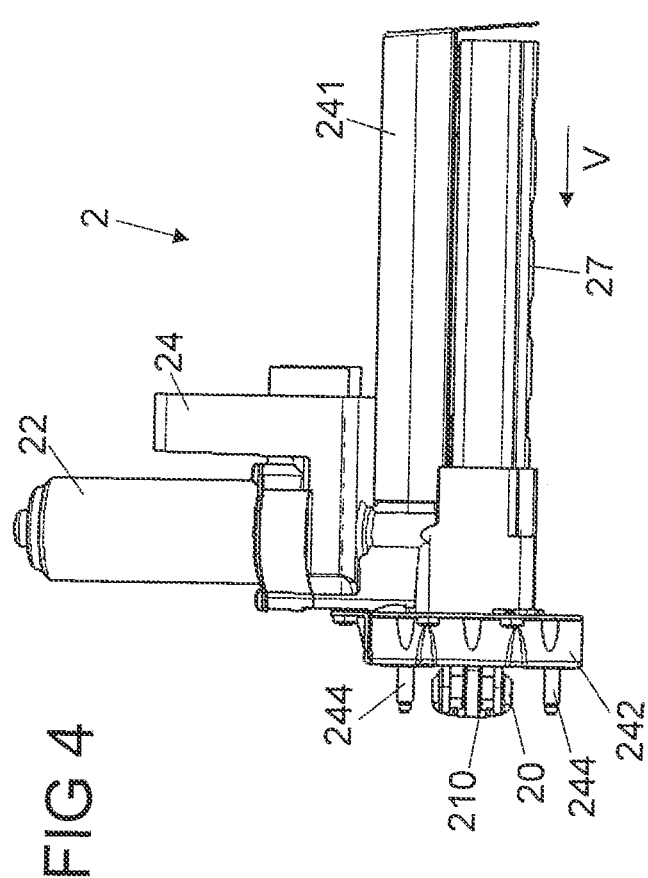
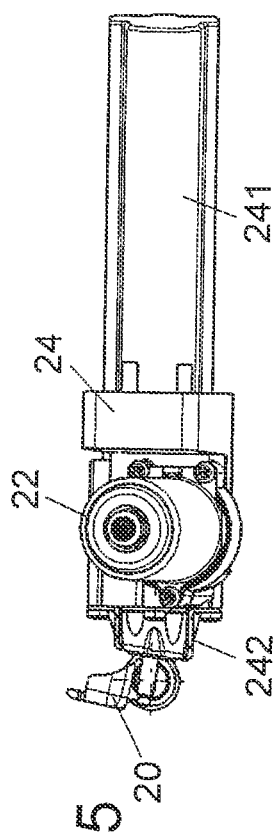

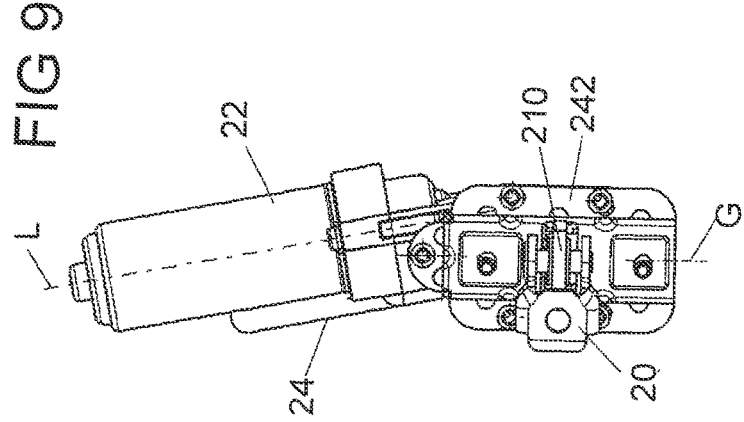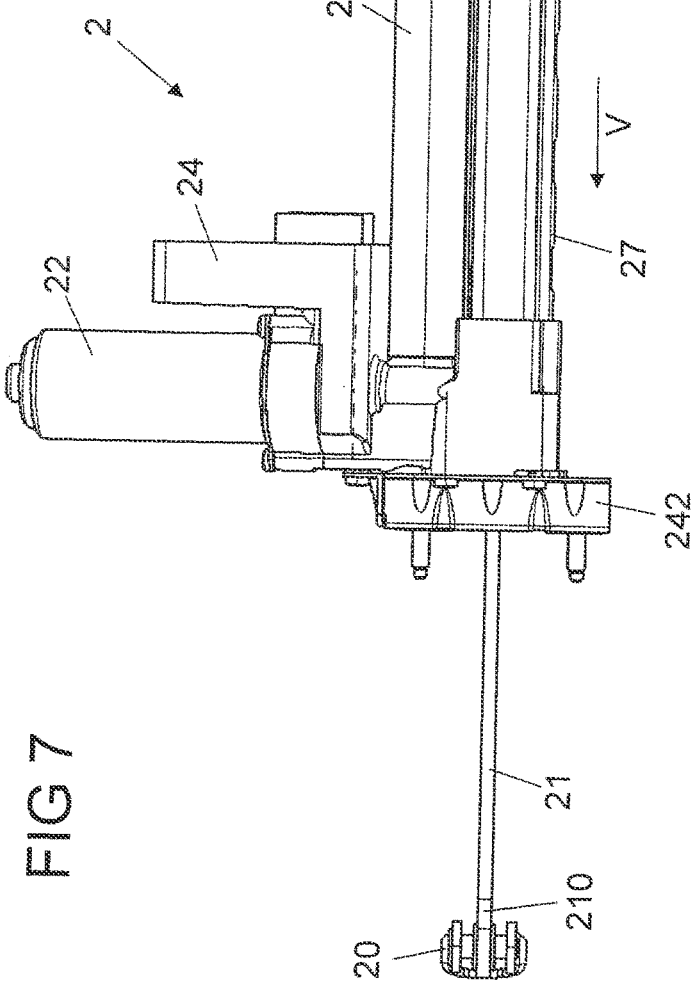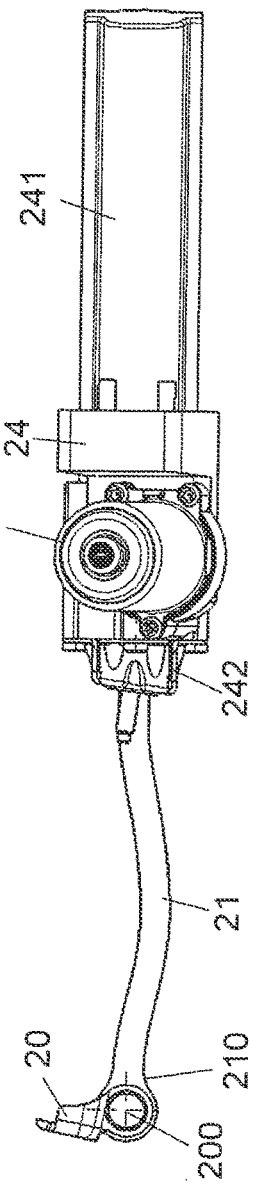

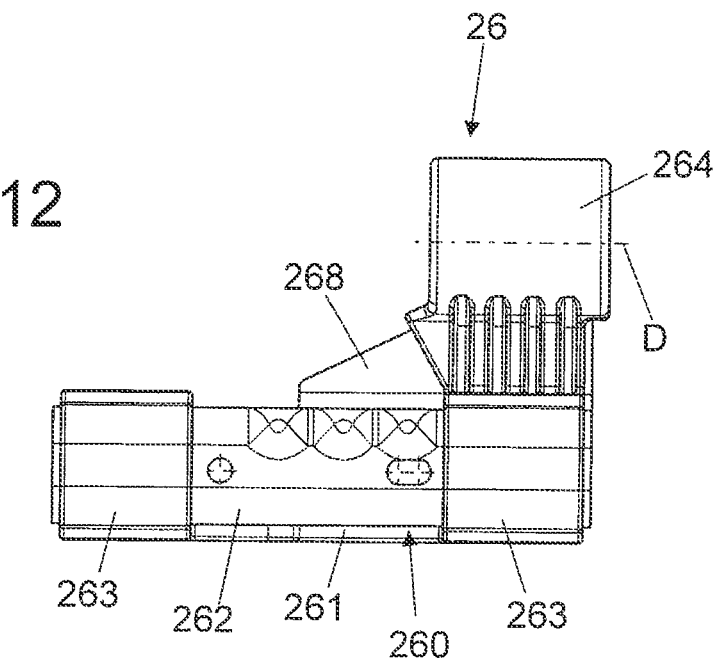
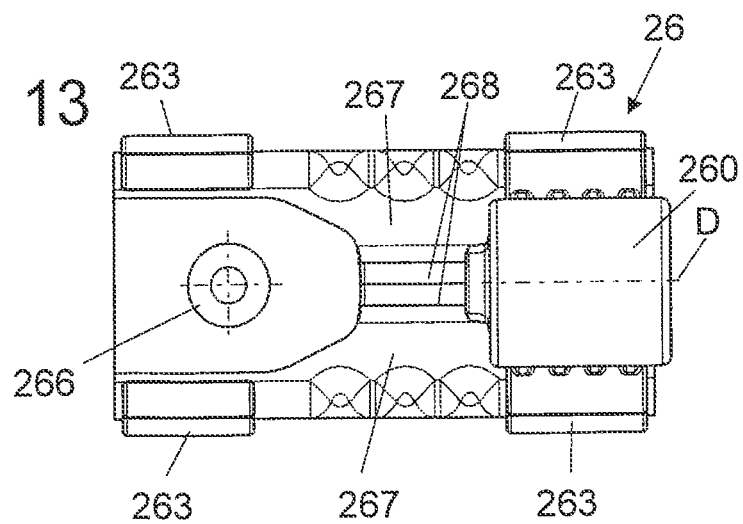

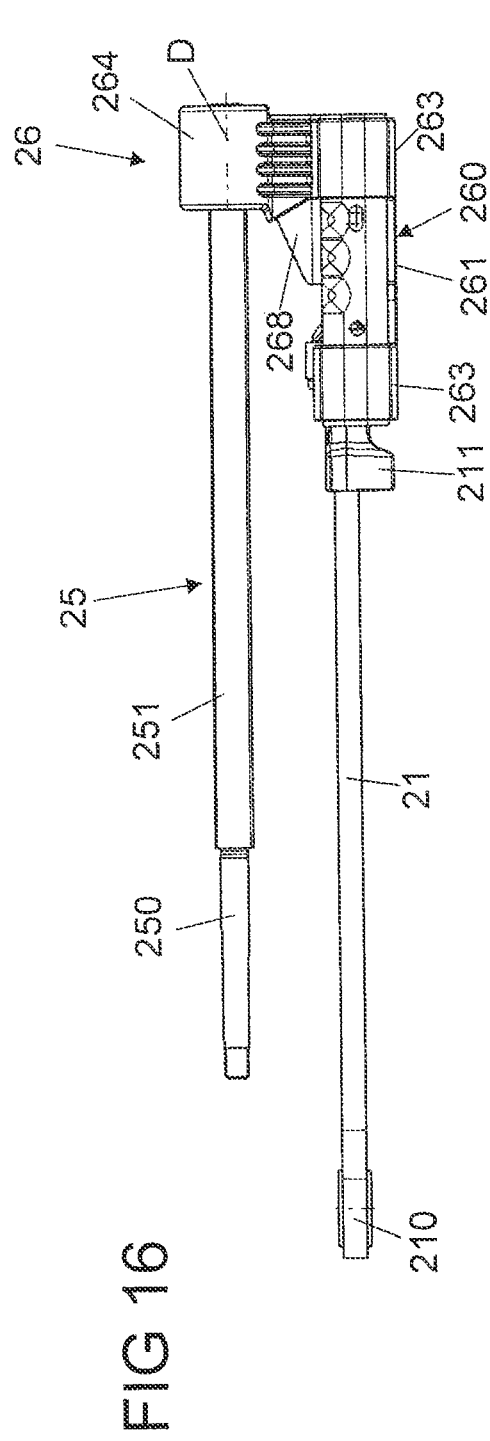
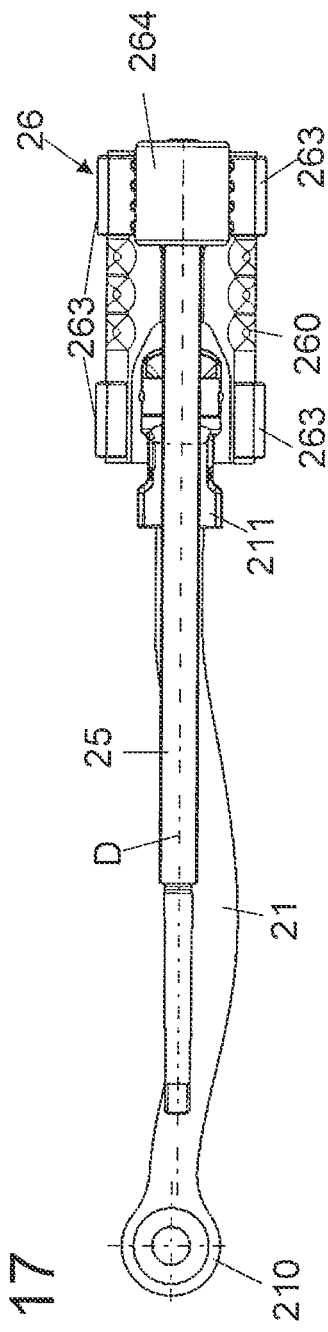

DOOR DRIVE APPARATUS HAVING A GEAR ASSEMBLY COMPRISING A GUIDE RAIL

CROSS-REFERENCE TO RELATED APPLICATIONS

This application is the U.S. National Phase of PCT Application No. PCT/EP2020/072400 filed on Aug. 10, 2020, which claims priority to German Patent Application No. DE 10 2019 211 932.8, filed on Aug. 8, 2019, the disclosures of which are hereby incorporated in their entirety by reference herein.

TECHNICAL FIELD

The present disclosure relates to a door drive apparatus for adjusting a vehicle door relative to a vehicle body.

BACKGROUND

Vehicles may include a number of door drive devices that may be operated to hold or adjust a position of a vehicle door with respect to the body of the vehicle. Such door drive devices may include an adjustment part for power transmission between the vehicle door and the vehicle body and a drive motor which is coupled to the adjustment part via a gear assembly.

SUMMARY

One or more objects of the present disclosure may be to provide a door drive apparatus which can be of space-saving design and provides for a reliable adjusting operation for adjusting the vehicle door relative to the vehicle body.

According to one or more embodiments, a door drive apparatus including an adjustment part, drive motor, and a gear assembly coupling the drive motor to the adjustment part. The gear assembly includes a guide rail and a sliding element longitudinally guided on the guide rail along an adjustment direction, adjustable by the drive motor and coupled to the adjustment part, and the guide rail includes two legs extended parallel to each other along the adjustment direction and the sliding element is guided between the legs along the adjustment direction.

In such a door drive apparatus, the drive motor, for example, can be stationarily arranged on the vehicle door. In this case, the guide rail also is firmly connected to the vehicle door and thus fixed relative to the vehicle door. The adjustment part on the other hand is supported on the vehicle body and can be adjusted by adjusting the sliding element on the guide rail such that the vehicle door is moved relative to the vehicle body.

Alternatively, it is conceivable that the drive motor is stationarily arranged on sides of the vehicle body. In this case, the guide rail is fixed relative to the vehicle body, while the adjustment part is supported on the vehicle door, and thus an adjusting force can be introduced into the vehicle door by adjusting the sliding element on the guide rail.

The guide rail may form a defined path of movement for the sliding element. Because the guide rail can be stationarily fixed to the associated assembly, for example, the vehicle door, a space-saving construction becomes possible with a defined adjusting movement of the adjustment part.

The guide rail includes two legs between which the sliding element is slidingly guided. Thus, the sliding element rests in the guide rail and can be slidingly moved between the legs along the adjustment direction.

In one embodiment, the guide rail is formed by a bent sheet-metal part. The guide rail is extended longitudinally along the adjustment direction, and the legs for example can be connected to each other via a base so that the guide rail for example has a U-shape or a C-shape in a cross-section transversely to the adjustment direction. In the guide rail a guide channel is formed, which specifies a longitudinal guide for the sliding element along a rectilinear or possibly also curved path of movement.

In one embodiment, each leg of the guide rail has an edge located away from the base, and one of the edges or possibly also both edges are bent over in such a way that the respective edge points towards the respective other leg of the guide rail. When both edges are bent over towards the inside, there is obtained a guide rail which has a C-shape in a cross-section transversely to the adjustment direction and which thus circumferentially encloses the sliding element guided in the guide rail in such a way that the sliding element is slidingly shiftable in the guide rail longitudinally along the adjustment direction, but is fixed by the guide rail in a plane transversely to the adjustment direction.

In one embodiment, the sliding element includes a structural part and a sliding portion arranged on the structural part for sliding contact with the guide rail. The structural part serves to provide a rigid structure of the sliding element. The sliding portion formed on the structural part on the other hand serves to improve the sliding properties of the sliding element for sliding in the guide rail.

Additionally or as an alternative to the sliding portion of the sliding element, the guide rail can be made of a material optimized for slide pairing with the sliding element or can be coated with a slide-optimized material.

For example, the structural part can be made of a metal material. The structural part can be formed for example as a bent sheet-metal part, and thus forms a stiffening structure for the sliding element.

In one embodiment, the structural part includes a base and two legs molded thereto. The sliding portion for example can be formed on the outside of the legs and/or on the outside of the base and serves for contact with the guide rail so that the structural part, such as the legs and the base of the structural part, are not directly in contact with the guide rail and hence the sliding behavior of the sliding element is determined by the sliding portions.

In one embodiment, the sliding element includes a coupling element articulated to the adjustment part and arranged between the legs of the structural part. The coupling element for instance can have the shape of a ball head and produce an articulated coupling with the adjustment part so that the adjustment part is articulately adjustable relative to the sliding element. Due to the fact that the coupling element is arranged between the legs of the structural part, the coupling of the sliding element with the adjustment part is made in the interior of the structural part, which can help to save space.

In one embodiment, the adjustment part includes a coupling part which is arranged on the coupling element of the sliding element and can be released from the coupling element when a limit load is exceeded. The coupling part for instance is firmly connected to the adjustment part, for instance in that the coupling part is formed integrally with the adjustment part. Via the coupling part, an articulated connection between the adjustment part and the sliding element is produced, and the coupling part for example forms a receiving opening into which the coupling element of the sliding element engages with a ball head so that an articulated connection between the sliding element and the adjustment part is produced thereby.

The coupling part may be connected to the coupling element in such a way that the connection can be released when a limit load is exceeded. This means that when properly operating, the coupling part is articulated to the coupling element and thus an adjusting force can be introduced into the adjustment part. For instance, when the door drive apparatus fails in the case of a malfunction and hence becomes blocked, a user can act on the vehicle door to be adjusted and thereby cause a load to be applied between the adjustment part and the sliding element, which leads to the fact that the connection between the coupling part of the adjustment part and the coupling element of the sliding element is released so that the connection between the adjustment part and the sliding element is eliminated and the door can be moved manually by a user.

Via the coupling of the coupling element to the coupling part of the adjustment part a predetermined breaking point thus is created in the system, at which the power transmission strain can be eliminated in the event of a blockage so that a user is enabled to adjust the vehicle door in the event of a blockage of the door drive.

To provide such a predetermined breaking point, the coupling part for instance can have such a weak point that the coupling part can break in a defined way when the limit load is exceeded.

To provide such a predetermined breaking point, the coupling part additionally or alternatively can include for instance a resiliently designed form-fit element enclosing a body of the coupling part, which when properly positioned produces a positive connection between the coupling part and the coupling element. When the limit load between the adjustment part and the sliding element is exceeded, the positive connection can be released so that the adjustment part can be moved independently of the sliding element.

The sliding portion can be attached to the structural part as a separate element for example made of plastic.

Alternatively, the sliding portion in one embodiment is molded to the structural part from plastic, for instance by using an injection molding method. In an injection molding tool, the sliding portion can be formed on the structural part by overmolding or injection molding, in that the structural part is inserted into the injection molding tool as a so-called insert (when overmolding completely) or as a so-called outsert (when overmolding only partly) and in that the material of the sliding portion is injection-molded to the structural part in the injection molding tool.

Functional portions of the sliding element here can be formed integrally with the sliding portion, for example the coupling element for coupling the sliding element to the adjustment part or also a spindle nut portion for coupling the sliding element to a spindle of a spindle gear unit of the gear assembly.

In one embodiment, the gear assembly includes a spindle that is rotatable about an axis of rotation and can be driven by the drive motor. The sliding element is in thread connection with the spindle so that by rotating the spindle, the sliding element can be longitudinally moved along the adjustment direction. The spindle for instance has an external thread that is in thread connection with an internal thread formed on the sliding element so that when the spindle is rotated, the sliding element rolls off on the spindle and thus is longitudinally adjusted with respect to the spindle.

In one embodiment, the sliding element has a spindle nut portion with a threaded opening formed therein, in which an internal thread is formed to produce a thread connection with the spindle. The spindle engages in the threaded opening and thereby is coupled to the spindle nut portion so that by rotating the spindle, the sliding element is axially adjustable along the spindle and the adjustment part thereby is movable for adjusting the vehicle door.

Thus, in the door drive apparatus a gear assembly in the form of a spindle drive is used, via which adjusting forces can be introduced into the adjustment part for adjusting the vehicle door. Such a spindle drive can be of simple construction with few components and provides for a reliable and loadable power transmission.

The spindle nut portion of the sliding element for instance is formed integrally and in one piece with the sliding portion, for instance by means of injection molding in an injection molding tool. In injection molding, the threaded opening also is formed integrally with the internal thread formed therein.

The spindle nut portion for example can be stiffened by upright portions of the structural part adjoining the legs of the structural part, so that via the spindle nut portion a reliable force introduction into the sliding element is possible for adjusting the sliding element on the guide rail.

In one embodiment, the gear assembly includes a gear housing and a gear wheel mounted on the gear housing for power transmission from the drive motor to the sliding element. The gear wheel can be configured for example as a spur gear and can be non-rotatably arranged on the spindle. The drive motor for example can include a drive shaft and a drive worm arranged on the drive shaft, which is in meshing engagement with the gear wheel so that a rotary movement of the shaft is converted into a (stepped-down) rotary movement of the gear wheel.

The guide rail can be firmly connected to the gear housing, for instance in that the guide rail is attached to the gear housing with a flange portion and for example is connected to the gear housing via a screw connection. Alternatively, the guide rail can at least sectionally be overmolded by the material of the guide rail and thus be cohesively connected to the gear housing. Again as an alternative, the guide rail can also be formed integrally with the gear housing, for example from plastic.

In one embodiment, the sliding element in a first position along the adjustment direction is disposed away from the gear housing, for instance in the case of an adjustment part at least partly retracted into the guide rail. In a second position, the sliding element on the other hand is approached to the gear housing and, as seen along the adjustment direction, is disposed in an axial overlap with at least one portion of the gear housing. Thus, in the second position (in an end position, for example when the adjustment part is extended from the guide rail) the sliding element adjustable in the guide rail dips under the gear housing. This provides for an additional space-saving design of the door drive apparatus with a comparatively large adjustment path for the sliding element on the guide rail.

A door drive apparatus as described above can be used as a door drive on a vehicle side door or also on a liftgate or another vehicle opening.

BRIEF DESCRIPTION OF THE DRAWINGS

The idea underlying the invention will be explained in detail below with reference to the exemplary embodiments illustrated in the Figures, in which:

FIG. 4 shows another view of the door drive apparatus, from the side;

FIG. 5 shows a view of the door drive apparatus, from above;

FIG. 6 shows a frontal view of the door drive apparatus;

FIG. 7 shows the view of FIG. 4, but with the adjustment part extended;

FIG. 8 shows the view of FIG. 5, with the adjustment part extended;

FIG. 9 shows the view of FIG. 6, with the adjustment part extended;

FIG. 12 shows a separate side view of a sliding element of a gear assembly of the door drive apparatus;

FIG. 13 shows a top view of the sliding element;

FIG. 16 shows a side view of a gear assembly of the door drive apparatus;

FIG. 17 shows a top view of the gear assembly;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A door drive apparatus described in DE 10 2015 215 627 A1 for example includes an adjustment part in the form of a catch strap, which can be articulated to a vehicle body and can be adjusted via a drive apparatus on sides of the vehicle door so as to move the vehicle door relative to the vehicle body. The drive apparatus includes a cable drum which can be rotated and is connected to the adjustment part in the form of the catch strap via a transmission element in the form of a traction cable so that by rotating the cable drum the adjustment part can be moved to the cable drum and the vehicle door can thereby be adjusted.

In such a door drive apparatus, the drive motor can be arranged for example on sides of the vehicle door. The adjustment part here is coupled to the vehicle body and also operatively connected to the drive motor in such a way that the adjustment part can be adjusted via the drive motor and thereby a force can be effected between the vehicle door and the vehicle body for electromotively adjusting the vehicle door relative to the vehicle body. Because for example the installation space in the vehicle door is constrained, such a door drive apparatus should be of space-saving design so that the door drive apparatus requires only a comparatively small installation space for example in a vehicle door.

Figure 1:
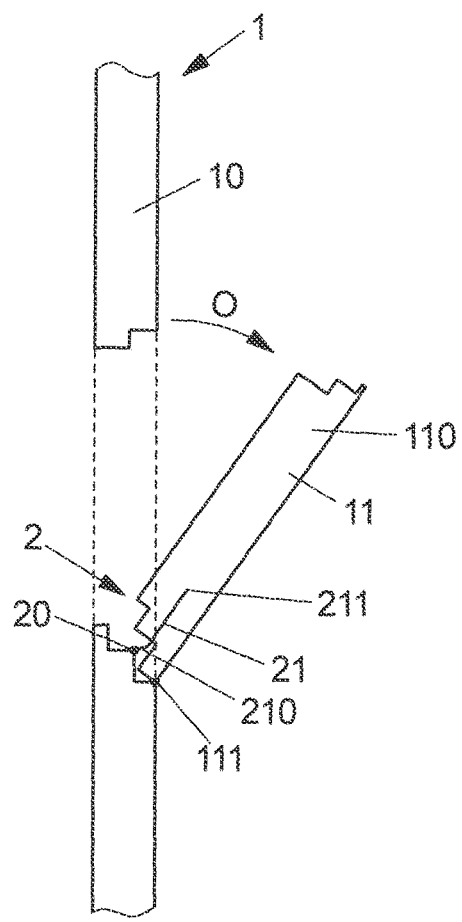
FIG. 1 shows a schematic view of a vehicle door on a vehicle body, including an adjustment part in the form of a push element which is articulated to the vehicle body and which on pivoting of the vehicle door is moved relative to the vehicle door.
Figure 2:
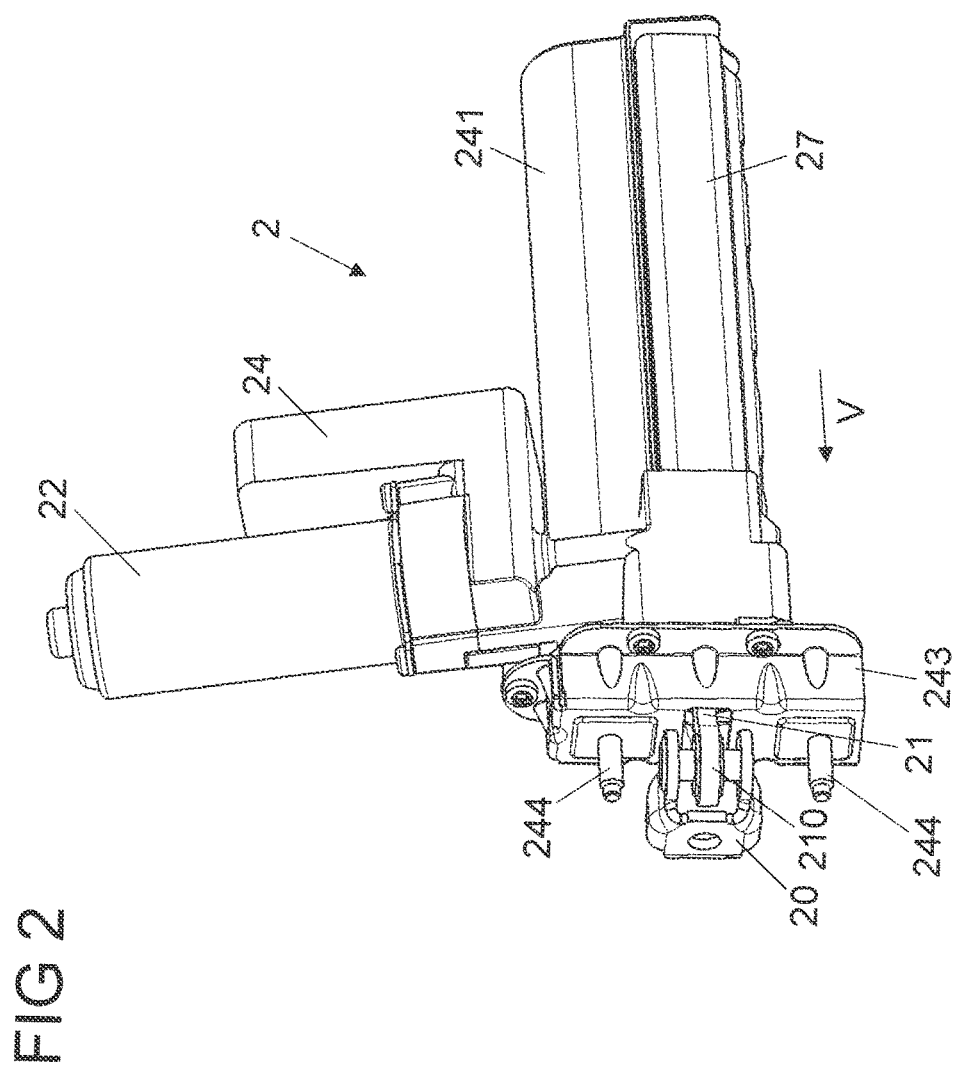
FIG. 2 shows a view of an exemplary embodiment of a door drive apparatus for adjusting a vehicle door.

FIG. 1 shows a schematic view of a vehicle 1 with a vehicle body 10 and a vehicle door 11 articulated to the vehicle body 10 about a door hinge 111, which vehicle door can be pivoted relative to the vehicle body 10 along an opening direction θ in order to clear or close a door opening.

What acts between the vehicle body 10 and the vehicle door 11 is a door drive apparatus 2 which includes an adjustment part 21 in the form of a push element and serves for adjusting the vehicle door 11 relative to the vehicle body 10. The adjustment part 21 in the form of the push element is articulated to the vehicle body 10, for example to the A-pillar of the vehicle 1, about a joint 20 and on pivoting of the vehicle door 11 moves relative to the vehicle door 11. With one end 211 the adjustment part 21 therefor protrudes into a door interior space 110 of the vehicle door 11 and on adjustment of the vehicle door 11 moves in this door interior space 110.

FIGS. 2 to 19 show views of an exemplary embodiment of a door drive apparatus 2, which serves for adjusting an adjustment part 21 and thereby for moving a vehicle door 11 relative to a vehicle body 10.

The door drive apparatus 2 includes an electromotive drive motor 22 which serves for driving a spindle 25 of a gear assembly of the door drive apparatus 2, which is rotatable about an axis of rotation D. The drive motor 22 includes a motor shaft 220 and a drive worm 221 arranged thereon, including worm toothing that meshes with a gear wheel 230 in the form of a spur gear of a transmission 23.

The gear wheel 230 is arranged on a shaft 233 and non-rotatably connected to a portion 250 of the spindle 25 via the shaft 233 so that the gear wheel 230 is non-rotatably fixed with respect to the spindle 25.

Via bearings 231, 234, the gear wheel 23 is rotatably mounted with respect to a gear housing 24 about the axis of rotation D of the spindle 25. As illustrated in the partial sectional views of FIGS. 10 and 11 in a synopsis with the exploded view of FIG. 3, a bearing 231 is received in a bearing bush 232 and thereby supported in a bearing opening 240 of the gear housing 24. Another bearing 234 on the other hand rests in a portion 245 of the gear housing 24 and provides a bearing for the shaft 233 at an end of the shaft 233 facing away from the bearing 231.

The door drive apparatus 2 includes a sliding element 26 and a guide rail 27. As illustrated in the exploded view of FIG. 3, the guide rail 27 is received in a receiving opening 246 of the gear housing 24 and firmly connected to the gear housing 24 via flange portions 273.

The sliding element 26 slidingly rests in the guide rail 27 in such a way that the sliding element 26 can be longitudinally adjusted on the guide rail 27 along an adjustment direction V. In a cross-section transversely to the adjustment direction V, the guide rail 27 has a C-shape, formed by a base 270 and legs 271 laterally extended on the base 270 and angled with respect to the base 270, whose edges 272 located away from the base 270 are bent over such that they point towards each other. The sliding element 26 is guided in the guide rail 27 in such a way that the sliding element 26 is received between the legs 271 and is circumferentially enclosed by the base 270, the legs 271 and the bent edges 272.

In the illustrated exemplary embodiment, the guide rail 27 is formed as a metallic bent sheet-metal part and via a mounting plate 242 and the flange portions 273 resting against the gear housing 24 is firmly connected to the gear housing 24 (see for example, FIG. 2 and FIGS. 4 to 6). The mounting plate 242 is connected to the gear housing 24 via fastening elements 243 in the form of screws by interposition of the flange portions 273 and can be fixed to a structural portion of the vehicle door 11, for example to a door inner panel portion, via fastening elements 244 in the form of screws, so that the door drive apparatus 2 thereby is fixed in the vehicle door 11.

The sliding element 26, as illustrated in the separate views of FIGS. 12 to 15, includes a structural part 260 that is formed as a metallic bent sheet-metal part. The structural part 260 includes a base 261 and legs 262 angled with respect to the base 261. Edges 267 of the legs 262 are bent towards each other, and portions 268 adjoining the edges 267 are put up in such a way that they point away from the base 261, as this is shown for instance in FIG. 15.

The structural part 260 is partly overmolded by a plastic material, by which sliding portions 263 are formed on the outside of the legs 262, via which the sliding element 26 slidingly is in contact with the guide rail 27. The material of the sliding portions 263 here is optimized for a favorable sliding behavior on the guide rail 27, and for instance a coating can additionally be provided on the guide rail 27 for a further optimization of the sliding behavior.

What is formed integrally with the sliding portions 263 is a coupling element 266 in the form of a ball head that is arranged between the legs 262 of the structural part 260 and serves for the articulated coupling of the sliding element 26 to the adjustment part 21. An end 211 of the adjustment part 21 therefor is arranged on the coupling element 266 and thereby articulated to the sliding element 26, as this can be taken for instance from the views of the gear assembly as shown in FIGS. 16 to 19.

Due to the spherical shape of the coupling element 266, the adjustment part 21 is articulated to the sliding element 26 about the adjustment direction V and also about axes perpendicular to the adjustment direction V so that tolerances in the position of the adjustment part 21 relative to the sliding element 26 can be compensated.

Moreover, a spindle nut portion 264 is formed integrally with the sliding portion 263. The spindle nut portion 264 is formed on the upright portions 268 of the structural part 260 and includes a threaded opening 265 with an internal thread formed therein. The spindle 25 engages in the threaded opening 265 with a thread portion 251 so that via an external thread formed on the outside of the thread portion 251 the spindle 25 is in threaded engagement with the spindle nut portion 264 of the sliding element 26.

The sliding element 26 can be made by using a plastic injection molding method. For this purpose, the structural part 260 can be inserted into the injection molding tool as a so-called insert or outsert and sectionally be overmolded by an injection molding material to form the sliding portion 263, the coupling element 266 and the spindle nut portion 264.

Figure 3:
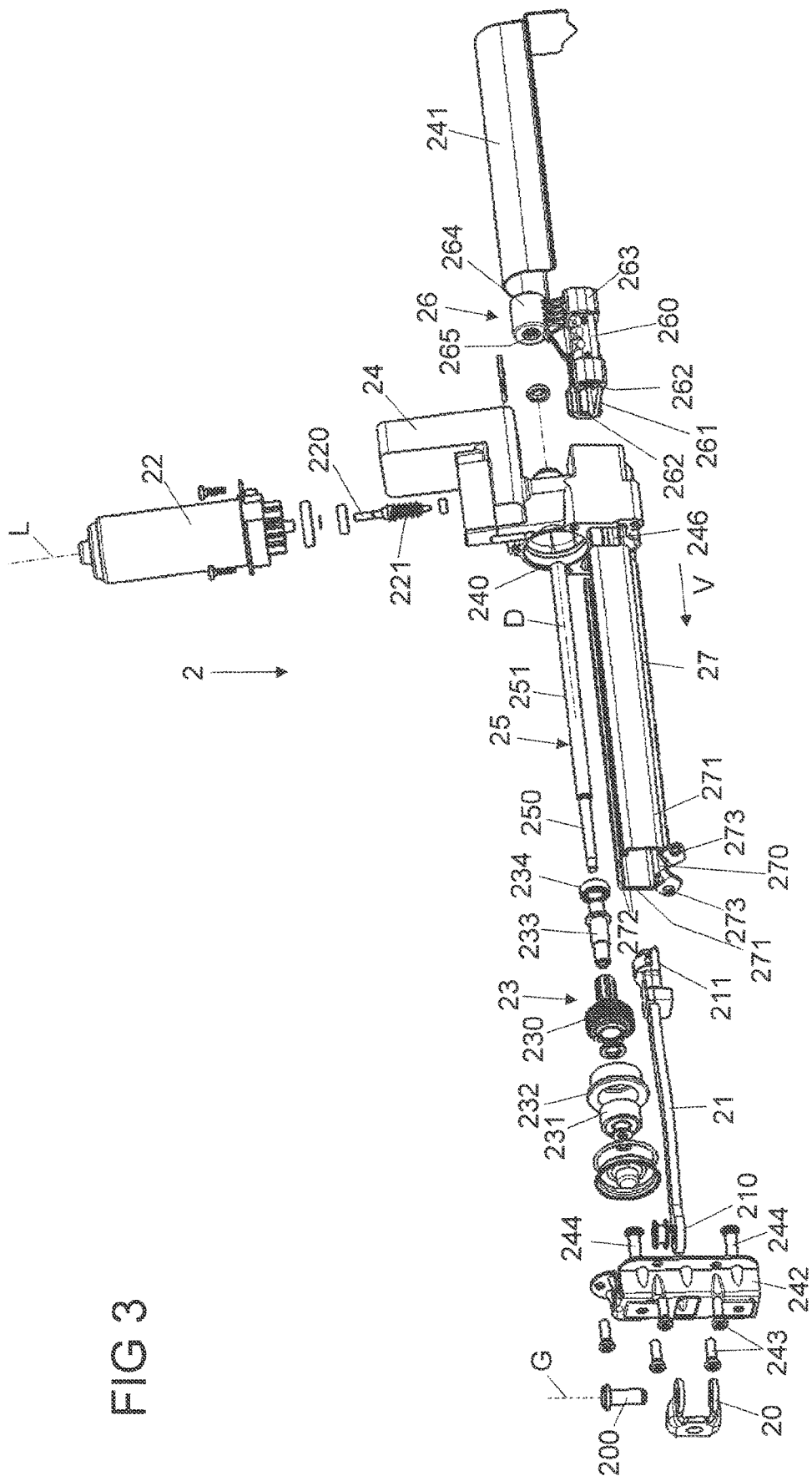
FIG. 3 shows an exploded view of the door drive apparatus.
Figure 10:
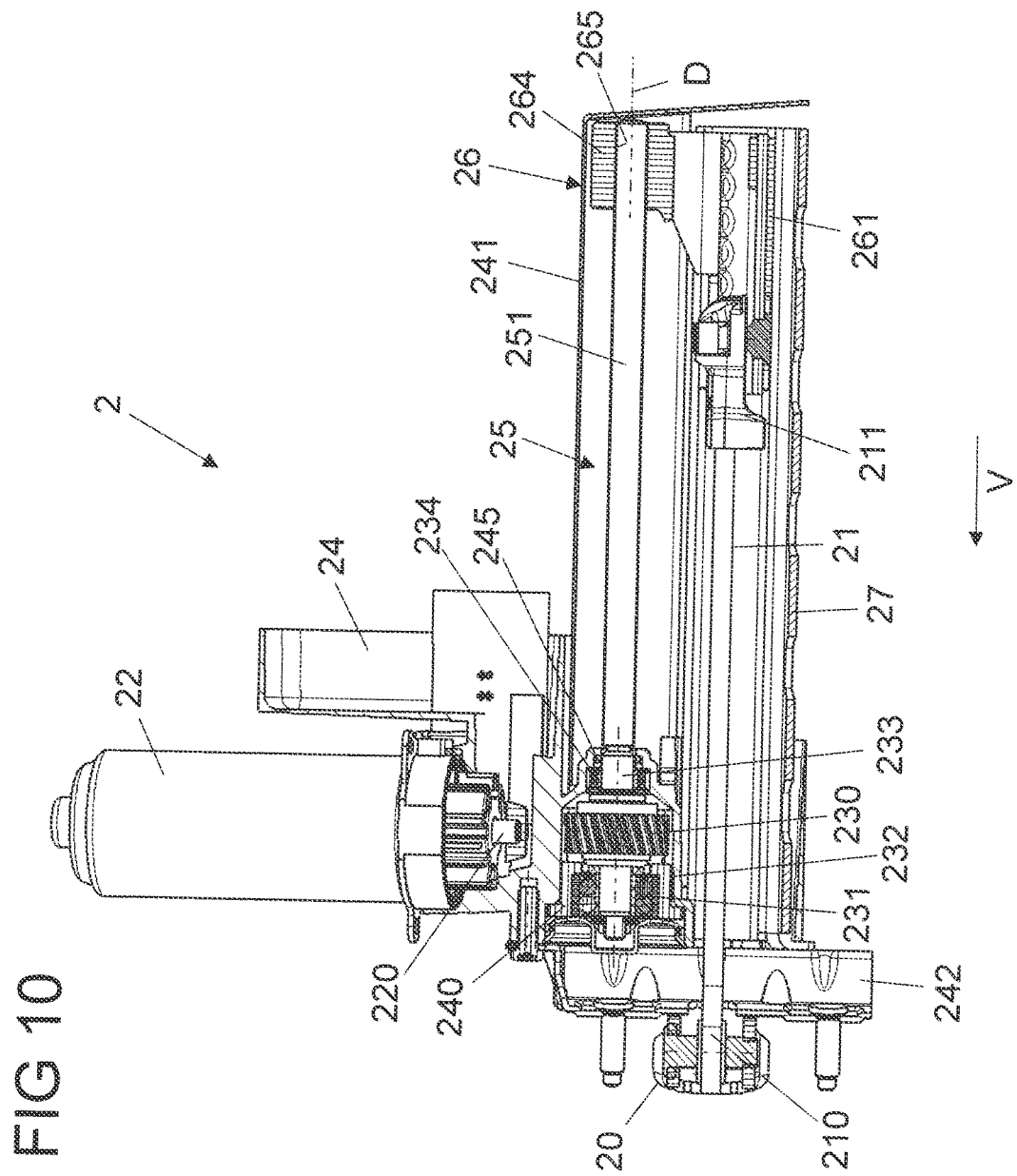
FIG. 10 shows a partly sectional view of the door drive apparatus, with the adjustment part retracted.

As can be taken from FIG. 3 in a synopsis with FIG. 10, a cover element 241 is arranged on the gear housing 24, which covers the guide rail 27 on the side of the edges 272 and thus encloses the spindle nut portion 264 of the sliding element 26 towards the outside along the path of movement specified by the guide rail 27.

The adjustment part 21 is articulately coupled to a joint 20 via a joint bolt 200 at an end 210 about a joint axis G, which joint is firmly connected to the vehicle body 10, as this is schematically shown in FIG. 1. At the end 211 located away from the end 210, the adjustment part 21 on the other hand is articulately coupled to the sliding element 26. By adjusting the sliding element 26, driven by the drive motor 22, the end 211 of the adjustment part 21 can be moved in the guide rail 27 so that the adjustment part 21 can be adjusted between a first, retracted position (FIGS. 4 to 6 and FIG. 10) and a second, extended position (FIGS. 7 to 9 and FIG. 11) in order to move the vehicle door 11 relative to the vehicle body 10 and adjust the same between a closed position (corresponding to the retracted position of the adjustment part 21) and an open position (corresponding to an extended position of the adjustment part 21).

As can be taken from the partly sectional view of FIG. 10, the sliding element 26 in the first, retracted position is located away from the gear housing 24 and approached to an end of the guide rail 27 located away from the mounting plate 242. In the second, extended position the sliding element 26 on the other hand is moved towards the gear housing 24 so that the spindle nut portion 264 is approached to the transmission 23 and the adjustment part 21 with its end 211 is moved in the adjustment direction V towards the mounting plate 242.

Figure 11:
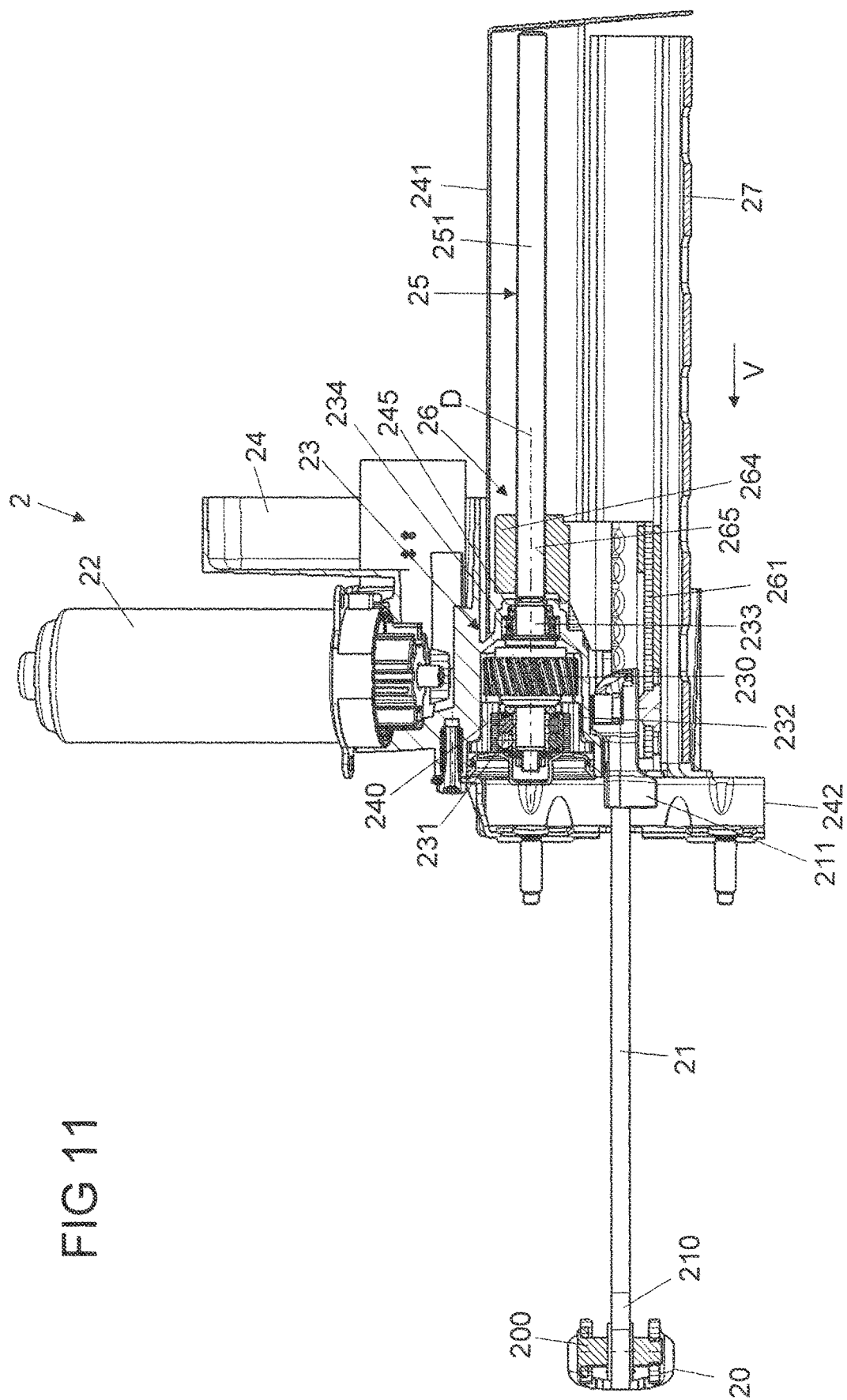
FIG. 11 shows the view of FIG. 10, but with the adjustment part extended.
Figure 14:
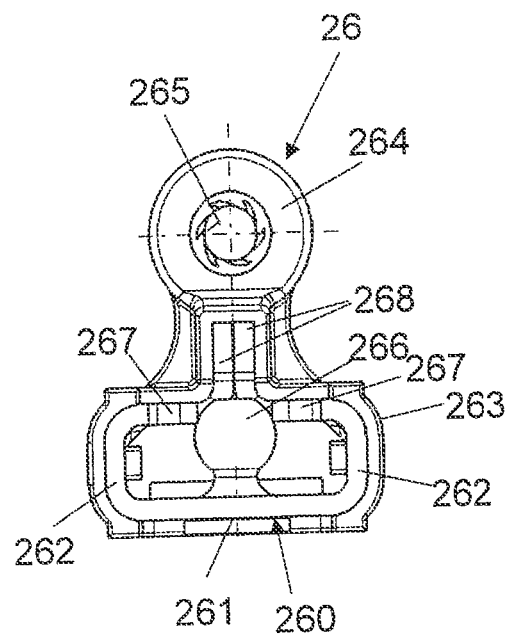
FIG. 14 shows a frontal view of the sliding element.
Figure 15:
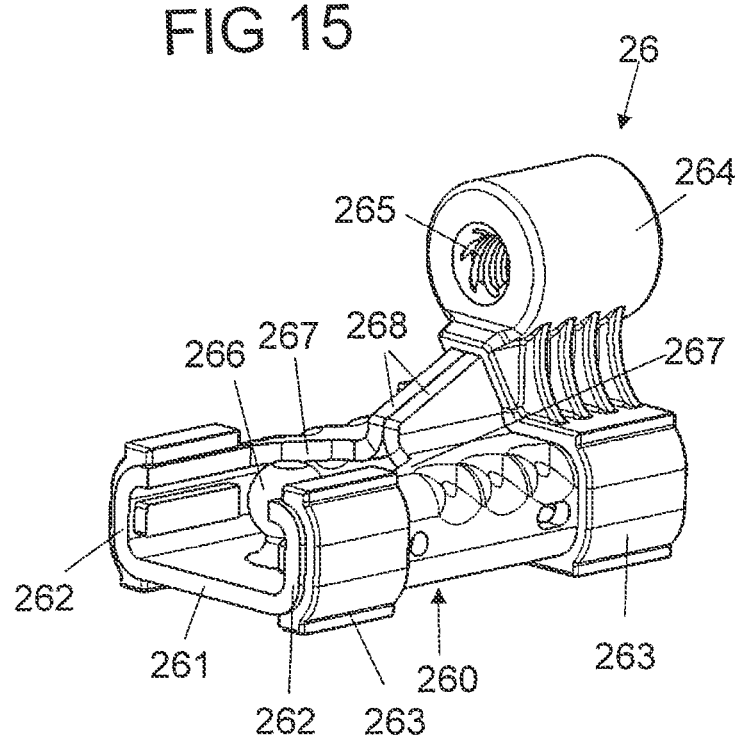
FIG. 15 shows a perspective view of the sliding element.
Figure 18:
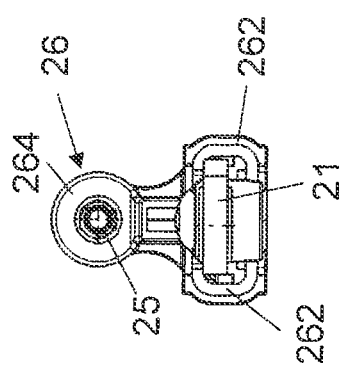
FIG. 18 shows a frontal view of the gear assembly.
Figure 19:
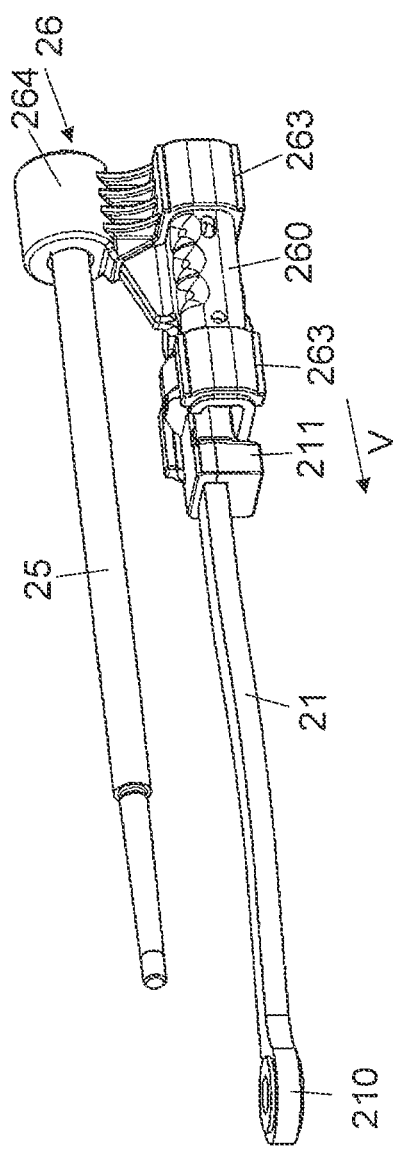
FIG. 19 shows a perspective view of the gear assembly.

In the second position, the sliding element 26 dips with the structural part 260 under the transmission 23, in that the sliding element 26, as seen along the adjustment direction V, comes into an axial overlap with the gear housing 24 and the transmission 23 received therein, as this is shown in FIG. 11. This provides for an installation space-efficient design of the drive apparatus 2, with a comparatively large stroke of the adjustment part 21 along the adjustment direction V and a small overall height transversely to the adjustment direction V, such as perpendicularly along the joint axis G.

As can be taken from FIG. 9, a longitudinal axis L, about which the motor shaft 22 of the drive motor 22 is rotatable, is positioned obliquely to the joint axis G about which the adjustment part 21 is articulated to the joint 20 at the end 210. This may contribute to a saving in installation space such as along a transverse direction (transversely to the joint axis G and transversely to the adjustment direction V).

For the adaptation of a kinematics, such as a transmission ratio, an adjustment part 21 such as can be chosen of the modular type, which can be used on the otherwise unchanged drive apparatus 2.

Possibly, the length of the guide rail 27 can additionally be adapted in order to set a stroke of the drive apparatus 2.

For the adaptation of a gear ratio of the gear assembly of the drive apparatus 2, the thread pitch of the spindle 25 can be adapted.

Alternatively, however, the drive apparatus 2 with upwardly protruding drive motor 22 can also be mounted in a vehicle door 11 with downwardly protruding drive motor 22. The drive motor 22 can also be arranged at an end of the guide rail 27 that faces away from the end of the guide rail 27 at which the adjustment part 21 exits from the guide rail 27. The drive apparatus 2 thereby can be universally adapted to different door models of different vehicles.

Figure 20:
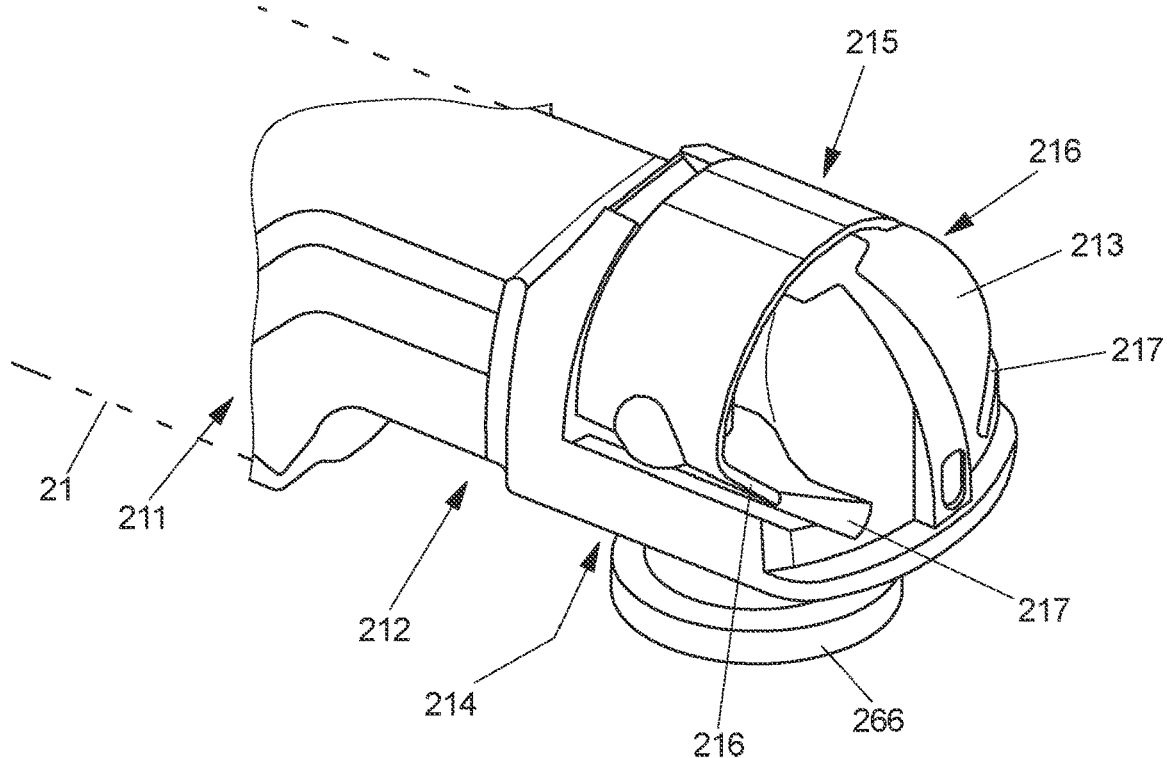
FIG. 20 shows a view of an exemplary embodiment of a coupling part of the adjustment part for coupling to the sliding element.

FIG. 20 shows a view of an exemplary embodiment of a connection between the adjustment part 21 and the coupling element 266 of the sliding element 26.

As has been described above, the coupling element 266 has a spherical shape and thereby produces an articulated connection with the adjustment part 21. The adjustment part 21 therefor has a coupling part 212 at its end 211 associated to the sliding element 26, which forms a body 213 and a receiving opening in the form of a receiving shell 214 formed therein, into which the coupling element 266 engages, as this can be taken from FIG. 20 in a synopsis with the schematic sectional view of FIG. 21.

In the operational position, the coupling element 266 is fixed to the coupling part 212 such that adjusting forces can be introduced into the adjustment part 21, but tolerances can be compensated via the articulated connection.

Figure 21:
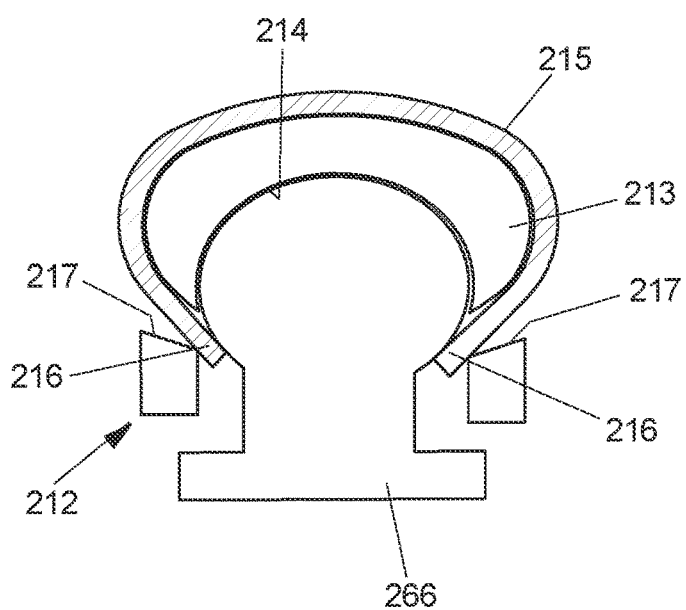
FIG. 21 shows a schematic cross-sectional view for illustrating the connection between the coupling part and a coupling element of the sliding element.

The coupling element 266 is positively fixed to the coupling part 212. For this purpose, the coupling part 212 includes a form-fit element 215 in the form of a clamp encompassing the body 213, which with locking edges 216 rests in engagement grooves 217 formed on opposite sides of the body 213 and thereby protrudes into the area of the receiving shell 214, as this is schematically shown in FIG. 21. Thus, a form fit with the crowned coupling element 266 is produced via the locking edges 216 so that the coupling element 266 is fixed with respect to the coupling part 212.

When for example in the event of a blockage of the door drive apparatus 2 a load force is acting between the adjustment part 21 and the sliding element 26 (which is immovably fixed due to the blockage), which exceeds a limit load, the positive connection between the coupling element 266 and the coupling part 212 can be released in that the form-fit element 215 is bent up in the area of its locking edges 216 and the coupling element 266 thus can get out of engagement with the receiving shell 214. The connection between the adjustment part 21 and the sliding element 26 thus is released so that the adjustment part 21 and thus the vehicle door 11 can be moved independently of the door drive apparatus 2.

The form-fit element 215 for example can be formed of an elastic material, for example a spring steel. The form-fit element 215 for example can be arrested at the body via a welded joint so that the form-fit element 215 cannot slip on the body 213 and thus in the operational position a reliable connection is produced between the adjustment part 21 and the sliding element 26.

The idea underlying the invention is not limited to the exemplary embodiments described above, but can also be realized in entirely different embodiments.

A door drive apparatus as described above can be used, for example, on a vehicle side door, just like on a liftgate or also on another vehicle opening.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1 vehicle
10 body
11 vehicle door
110 door interior space
111 door hinge
2 door drive apparatus
20 joint
200 joint bolt
21 adjustment part (push element)
210, 211 end
212 coupling part
213 body
214 receiving shell
215 form-fit element
216 locking edge
217 engagement groove
22 drive motor
220 motor shaft
221 drive worm
23 transmission
230 gearwheel
231 bearing
232 bearing bush
233 shaft
234 bearing
24 gear housing
240 bearing opening
241 cover element
242 mounting plate
243, 244 fastening element
245 portion
246 receiving opening
25 spindle
250 portion
251 thread portion
26 sliding element
260 structural part
261 base
262 leg
263 sliding portion
264 spindle nut portion
265 threaded opening
266 coupling element
267 edges
268 upright portion
27 guide rail
270 base
271 leg
272 edges
273 flange portion
D axis of rotation
G joint axis
L longitudinal axis
O opening direction
V adjustment direction

The invention claimed is:

1. A door drive apparatus configured to adjust a vehicle door relative to a vehicle body, the door drive apparatus comprising:
  an adjustment part configured to provide power transmission between and connect the vehicle door and the vehicle body;
  a drive motor; and
  a gear assembly coupling the drive motor to the adjustment part, wherein the gear assembly includes a guide rail and a sliding element, wherein the guide rail is configured to longitudinally guide the sliding element along an adjustment direction, wherein the sliding element is adjustable by the drive motor and coupled to the adjustment part, wherein the guide rail includes two legs extending parallel to each other along the adjustment direction and the sliding element is configured to be guided between the two legs and to contact inner faces of the legs as the sliding element moves in the adjustment direction, wherein the sliding element includes a structural part and a sliding portion arranged on the structural part, wherein the sliding portion is configured to contact and slide along the inner faces of the two legs of the guide rail, wherein the gear assembly includes a spindle comprising a screw thread and the spindle being configured to be driven by the drive motor and rotate about an axis of rotation, wherein the sliding element is arranged on the screw thread of the spindle so that rotating the spindle causes a longitudinal movement of the sliding element along the adjustment direction, wherein the sliding element includes a spindle nut portion provided with a threaded opening, wherein the spindle is configured to engage the threaded opening, wherein the spindle nut portion is formed by injection molding on the structural part, wherein the gear assembly includes a gear housing and a gear wheel mounted in the gear housing, wherein the gear wheel is non-rotatably mounted on the spindle and is configured to transmit power from the drive motor to drive the spindle and the sliding element, and wherein the sliding element is configured to move along the adjustment direction between a first position, in which the sliding element is spaced at a distance from the gear housing when viewed along the adjustment direction, and a second position, in which the sliding element is arranged proximally to the gear housing when viewed along the adjustment direction, wherein when the sliding element is in the second position, the spindle nut portion is arranged at an axial distance to the gear wheel, when viewed along the adjustment direction, and the structural part extends beyond the spindle nut portion, when viewed along the adjustment direction, such that the structural part at least partially an overlaps with a radius of the gear wheel.

2. The door drive apparatus of claim 1, wherein the guide rail is formed by a bent sheet-metal part.

3. The door drive apparatus of claim 1, wherein the guide rail includes a base connecting the two legs to each other.

4. The door drive apparatus of claim 3, wherein each leg of the two legs forms an edge spaced apart from the base, wherein the edge of at least one of the two legs is bent.

5. The door drive apparatus of claim 1, wherein the structural part is formed of a metal material.

6. The door drive apparatus of claim 1, wherein the structural part includes a base and two legs, wherein the two legs of the structural part are formed on the base.

7. The door drive apparatus of claim 6, wherein the sliding portion is formed on an outer portion of the two legs of the structural part and an outer portion of the base of the structural part.

8. The door drive apparatus of claim 6, wherein the sliding element includes a coupling element configured to articulate with respect to the adjustment part, wherein the coupling element is disposed between the two legs of the structural part.

9. The door drive apparatus of claim 8, wherein the adjustment part includes a coupling part arranged on the coupling element, wherein the coupling part is configured to be released from the coupling element when an effective force acting between the adjustment part and the sliding element exceeds a force threshold.

10. The door drive apparatus of claim 1, wherein the sliding portion is formed on the structural part by injection molding.

11. A door drive apparatus configured to adjust a vehicle door relative to a vehicle body, the door drive apparatus comprising:

an adjustment part configured to provide power transmission between and connect the vehicle door and the vehicle body;

a drive motor; and a gear assembly coupling the drive motor to the adjustment part, wherein the gear assembly includes a guide rail and a sliding element, wherein the guide rail is configured to longitudinally guide the sliding element along an adjustment direction, wherein the sliding element is adjustable by the drive motor and coupled to the adjustment part, wherein the guide rail includes two legs extending parallel to each other along the adjustment direction and the sliding element is configured to be guided between the two legs and to contact inner faces of the legs as the sliding element moves in the adjustment direction, wherein the gear assembly includes a spindle configured to be driven by the drive motor and rotate about an axis of rotation, wherein the sliding element is connected to the spindle by a number of threads disposed between the spindle and the sliding element so rotating the spindle longitudinally adjusts a position of the sliding element along the adjustment direction, wherein the sliding element includes a structural part and a spindle nut portion provided with a threaded opening, wherein the spindle is configured to engage the threaded opening, wherein the spindle nut portion is formed by injection molding on the structural part, wherein the gear assembly includes a gear housing and a gear wheel mounted in the gear housing, wherein the gear wheel is non-rotatably mounted on the spindle and is configured to transmit power from the drive motor to drive the spindle and the sliding element, and wherein the sliding element is configured to move along the adjustment direction between a first position, in which the sliding element is spaced at a distance from the gear housing when viewed along the adjustment direction, and a second position, in which the sliding element is arranged proximally to the gear housing when viewed along the adjustment direction, wherein when the sliding element is in the second position, the spindle nut portion is arranged at an axial distance to the gear wheel when viewed along the adjustment direction, and the structural part extends beyond the spindle nut portion when viewed along the adjustment direction, such that the structural part at least partially overlaps with a radius of the gear wheel.

12. A door drive apparatus configured to adjust a vehicle door relative to a vehicle body, the door drive apparatus comprising:

a drive motor;

an adjustment part configured to connect the vehicle door and the vehicle body;

a guide rail including two legs;

a gear assembly coupling the drive motor to the adjustment part; and a sliding element operatively connected to the adjustment part and the gear assembly so that actuation of the drive motor moves the sliding element between the two legs of the guide rail along an adjustment direction to adjust a position of the vehicle door relative to the vehicle body, wherein the sliding element contacts inner faces of the legs of the guide rail, wherein the sliding element includes a structural part and a sliding portion arranged on the structural part, wherein the sliding portion is configured to contact and slide along the inner faces of the two legs of the guide rail, wherein the gear assembly includes a spindle comprising a screw thread and the spindle being configured to be driven by the drive motor and rotate about an axis of rotation, wherein the sliding element is arranged on the screw thread of the spindle so that rotating the spindle causes a longitudinal movement of the sliding element along the adjustment direction, wherein the sliding element includes a spindle nut portion provided with a threaded opening, wherein the spindle is configured to engage the threaded opening, wherein the spindle nut portion is formed by injection molding on the structural part, wherein the gear assembly includes a gear housing and a gear wheel mounted in the gear housing, wherein the gear wheel is non-rotatably mounted on the spindle and is configured to transmit power from the drive motor to drive the spindle and the sliding element, and wherein the sliding element is configured to move along the adjustment direction between a first position, in which the sliding element is spaced at a distance from the gear housing when viewed along the adjustment direction, and a second position, in which the sliding element is arranged proximally to the gear housing when viewed along the adjustment direction, wherein when the sliding element is in the second position, the spindle nut portion is arranged at an axial distance to the gear wheel, when viewed along the adjustment direction, and the structural part extends beyond the spindle nut portion, when viewed along the adjustment direction, such that the structural part at least partially overlaps with a radius of the gear wheel.

13. The door drive apparatus of claim 12, further comprising:
a coupling element fixed to the sliding element and configured to articulate with respect to the adjustment part; and
a coupling part fixed to the adjustment part and configured to be selectively attached to and detached from the coupling element in response to an effective force acting between the adjustment part and the sliding element exceeding a predetermined force threshold.

14. The door drive apparatus of claim 13, further comprising:
a resilient element including edges disposed between the coupling element and the coupling part to selectively attach the coupling element to the coupling part.

* * * * *